(12) United States Patent
Harvey et al.

(10) Patent No.: US 9,581,465 B2
(45) Date of Patent: Feb. 28, 2017

(54) APPARATUS AND METHOD FOR DISPLAYING A SYNTHETIC VISION SYSTEM VIEW DIRECTION

(71) Applicant: HONEYWELL INTERNATIONAL INC., Morristown, NJ (US)

(72) Inventors: Jason F. Harvey, Glendale, AZ (US); Gang He, Morristown, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 4 days.

(21) Appl. No.: 14/600,063

(22) Filed: Jan. 20, 2015

(65) Prior Publication Data
US 2016/0209233 A1 Jul. 21, 2016

(51) Int. Cl.
G01C 23/00 (2006.01)
G05D 1/02 (2006.01)
G05D 1/08 (2006.01)
G08G 5/00 (2006.01)

(52) U.S. Cl.
CPC ........... *G01C 23/005* (2013.01); *G01C 23/00* (2013.01); *G05D 1/02* (2013.01); *G05D 1/08* (2013.01); *G08G 5/0021* (2013.01)

(58) Field of Classification Search
CPC ...... G01C 23/00; G01C 23/005; G01C 23/05; G02B 2027/0118; G02B 2027/014; G02B 2027/012; G02B 2027/0123; G02B 2027/0125; G02B 2027/013; G08G 5/0017; G08G 5/0021; G08G 5/0026; G05D 1/00; G05D 1/02; G05D 1/08
See application file for complete search history.

(56) References Cited

U.S. PATENT DOCUMENTS

| 8,140,260 | B2 | 3/2012 | Feyereisen et al. | |
|---|---|---|---|---|
| 2010/0026525 | A1* | 2/2010 | Feyereisen | G01C 5/005 340/972 |
| 2010/0097241 | A1* | 4/2010 | Suddreth | G08G 5/04 340/972 |
| 2011/0130897 | A1* | 6/2011 | Gladysz, Jr. | G01C 23/00 701/15 |
| 2012/0056759 | A1* | 3/2012 | He | G01C 23/00 340/960 |
| 2012/0133529 | A1* | 5/2012 | He | G01C 23/00 340/977 |
| 2013/0169450 | A1* | 7/2013 | He | G01C 23/005 340/971 |

FOREIGN PATENT DOCUMENTS

EP 2148175 A1 1/2010

OTHER PUBLICATIONS

Aspen Avionics, A New Way to Look at Avionics; Evolution Synthetic Vision Pilot's Guide Supplement; Evolution Flight Display; 2012.

(Continued)

*Primary Examiner* — Van Trieu
(74) *Attorney, Agent, or Firm* — Lorenz & Kopf, LLP

(57) ABSTRACT

A system and method displays a synthetic vision system (SVS) image combined with a primary flight display (PFD) including a compass indicating the aircraft heading. An arc on or near the outer edge of the compass indicates the viewing frustum of the SVS view.

20 Claims, 4 Drawing Sheets

(56) References Cited

OTHER PUBLICATIONS

Diamond Aircraft; Supplement 5 D42L AFM; To the Airplane Flight Manual (AFM) DA42 L360 G1000 Synthetic Vision Technology; Doc. No. D42L-AFM-002, Feb. 28, 2012.
Garmin; 8/1 Synthetic Vision System (SVS)(Optioinal); Garmin G1000 Pilot's Guide for Cessna Nav III; 190-00498-07 Rev A; 2011.
Avidyne; Synthetic Vision; Jun. 26, 2011.
EP Extended Search Report for Application No. 16150975.7-1557 dated Jun. 23, 2016.
Anonymous, "G450 Synthetic Vision", Oct. 14, 2014, XP055280813, Retrieved from the Internet: URL:http://code7700.com/g450_svs.html#references (retrieved on Jun. 15, 2016).

* cited by examiner

APPARATUS AND METHOD FOR DISPLAYING A SYNTHETIC VISION SYSTEM VIEW DIRECTION

TECHNICAL FIELD

The exemplary embodiments described herein generally relates to aircraft displays and more particularly to helicopter synthetic vision system (SVS) displays.

BACKGROUND

Aircraft occasionally may have a flight path different than a heading, for example, when landing in a crosswind. Helicopter flying differs from fixed wing aircraft with significantly more vertical and lateral movement and dynamics, including a flight path often quite different than the heading of the helicopter.

When a SVS image is displayed on the Primary Flight Display (PFD) and the SVS view may be centered at an angle other than the heading, the pilot needs to be able to quickly correlate the displayed SVS view to information in the compass. The compass is usually centered at the heading direction so as to correlated and fly according to ATC issued heading instructions. As such, representing the current flight path direction, for example, as a flight path marker, on a typical rotorcraft synthetic vision system (SVS) display typically presents more issues in comparison to the fixed wing aircraft.

One known means involves drawing lines (frustum lines) on the compass from the aircraft symbol, or close to it, toward the edge of the compass's outer ring. This method works well to show the relationship of content inside the compass, especially lateral terrain and the flight plat. However, the frustum lines are less useful if the compass doesn't have a scale associated with it and can impede or conflict with other symbols displayed inside the compass. For example, when the compass area contains lateral deviation symbology for both current and armed navigation (Nav) mode, adding frustum lines can cause difficulties in not only identifying the frustum lines but can interfere with the reading of navigation information. In addition, simple frustum lines do not adequately provide awareness of the large differential between current track and heading conditions.

As a SVS display can be effective with reasonable compressions in order to ensure that the display can be effectively used for precise vertical controls and for scene information and threat displays, methods to effectively display the flight path information relative to the approach target (aim point) is an essential feature for a helicopter SVS primary flight display system.

Accordingly, it is desirable to provide a display system and method allowing the pilot to quickly correlate the content of the SVS display for comparing the view ahead of the aircraft to the aircraft's heading and discern the differences when path and heading are sufficiently different. Furthermore, other desirable features and characteristics of the exemplary embodiments will become apparent from the subsequent detailed description and the appended claims, taken in conjunction with the accompanying drawings and the foregoing technical field and background.

BRIEF SUMMARY

A display system and method provide visual guidance for maneuvering an aircraft.

A first exemplary embodiment is a display system for an aircraft comprising a display; an avionics system; a synthetic vision system; and a processor coupled to the display, avionics system, and synthetic vision system, the processor configured to ascertain flight parameters of the aircraft from the avionics system, the flight parameters including a heading; ascertain a view from the aircraft from the synthetic vision system, the view comprising a horizontal span; provide commands to the display to display the view; provide commands to the display to display a compass including a first index indicating the heading, the compass including a heading scale; and provide commands to the display to display an arc contiguous or adjacent to a portion of the heading scale representative of the horizontal span of the synthetic vision system view being displayed.

A second exemplary embodiment is a display system for an aircraft, the display system comprising a display; an avionics system; a synthetic vision system; and a processor coupled to the display, the avionics system, and the synthetic vision system, the processor configured to determine a heading of the aircraft from the avionics system; ascertain a view from the aircraft from the synthetic vision system; provide commands to the display to display the view; provide commands to the display to display a compass including an index indicating the heading, the compass including a ring; and provide commands to the display to display an arc associated with a portion of the ring, the arc representative of the horizontal span of the view being displayed.

A third exemplary embodiment is a method of providing visual guidance for maneuvering an aircraft, comprising ascertaining via a processor a synthetic vision system view from the aircraft, the synthetic vision system view comprising a horizontal span; determining via the processor a heading of the aircraft; displaying via the processor on a display a compass including an index indicating the heading, the compass including a ring; displaying the synthetic vision system view; and displaying an arc contiguous to a portion of the circumscribed ring representative of the horizontal span of the synthetic vision system view being displayed.

BRIEF DESCRIPTION OF THE DRAWINGS

The present invention will hereinafter be described in conjunction with the following drawing figures, wherein like numerals denote like elements.

DETAILED DESCRIPTION

Figure 1:
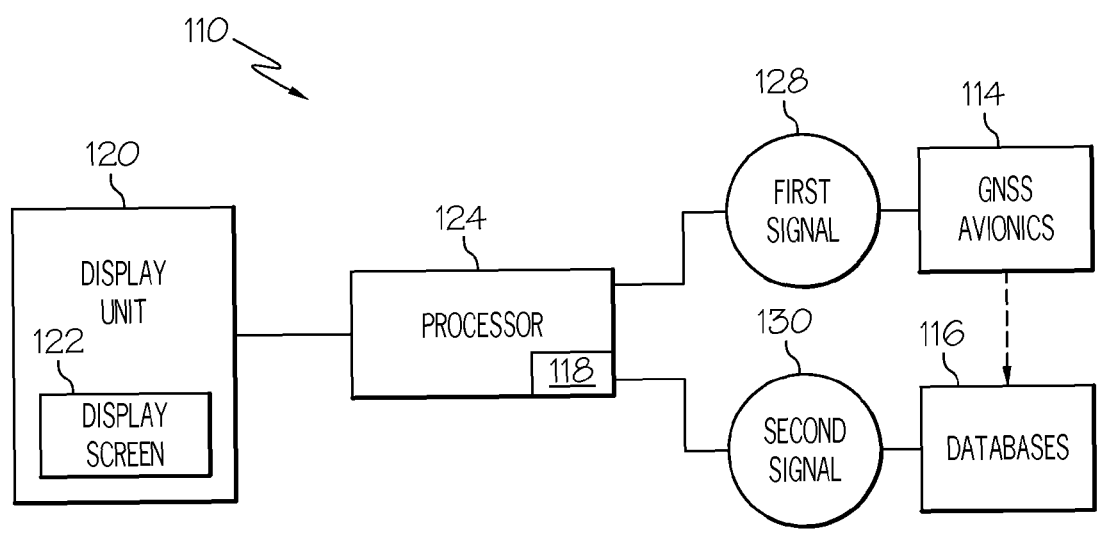
FIG. 1 is a block diagram of a vehicle display system for generating images in accordance with exemplary embodiments.

The following detailed description is merely illustrative in nature and is not intended to limit the embodiments of the subject matter or the application and uses of such embodiments. Any implementation described herein as exemplary is not necessarily to be construed as preferred or advantageous over other implementations. Furthermore, there is no intention to be bound by any expressed or implied theory presented in the preceding technical field, background, brief summary, or the following detailed description.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), vector processor, stream processor, specialized graphical processor used for general computations (GPGPU), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The word "exemplary" is used exclusively herein to mean "serving as an example, instance, or illustration." Any embodiment described herein as "exemplary" is not necessarily to be construed as preferred or advantageous over other embodiments. Any of the above devices are exemplary, non-limiting examples of a computer readable storage medium.

The steps of a method or algorithm described in connection with the embodiments disclosed herein may be embodied directly in hardware, in a software module executed by a processor, or in a combination of the two. A software module may reside in RAM memory, video memory (VRAM, DRAM), video card memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal. Any of the above devices are exemplary, non-limiting examples of a computer readable storage medium.

For the sake of brevity, conventional techniques related to graphics and image processing, navigation, flight planning, helicopter controls, helicopter data communication systems, and other functional aspects of certain systems and subsystems (and the individual operating components thereof) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

The following detailed description is merely exemplary in nature and is not intended to limit application and uses. Furthermore, there is no intention to be bound by any theory presented in the preceding background or the following detailed description.

In accordance with the exemplary embodiments described herein, a system and method displays a synthetic vision system (SVS) image combined with a primary flight display (PFD) including a compass indicating the aircraft heading. The compass is enclosed within and includes a circular ring. An arc on or near the outer edge of the ring indicates the viewing frustum of the SVS view. This arc is especially beneficial when the direction of aircraft travel (flight path) is different than what is seen directly ahead of the nose of the aircraft.

The arc's length is equal to the view angle of the SVS view frustum. The arc can be positioned so that is against the outer ring of the compass or offset away from the compass so that a gap is visible between the arc and the outer ring. The arc is rotated around the compass so that the center of the arc is positioned at the same angle as the SVS view direction, i.e., the angle that is half way between the left and right view frustum. The arc can be removed and or restored when the SVS content is removed or restored.

The arc may have any color, transparency and or thickness applied in order to make the arc more or less easy to distinguish on the display. It may be drawn as a line or a narrow polygon. A halo, or shadow like effect, can also be applied. The transparency can be slewed, for example, increased in intensity, based on some offset/difference between angles, for example, the alignment between track and heading. The arc can have a mark at the halfway point between the ends to indicate what angle corresponds to the center of the SVS view. Typically, when the difference between the heading and the current SVS view direction is small, the arc is less visible. It would be more visible when difference is larger.

A shape, for example a leg or bracket, may be attached to each end of the arc to make it easier to see the angles of the compass that correlate to the left and right edge of the SVS view and to indicated ends when they are behind another marker on the outer edge of the compass. The length of the arc can be dynamically adjusted corresponding to changes to the left and right extent of the SVS view due to roll, pitch or other changes to the SVS view.

The term "view frustum" as used herein means a frustum that is a truncated pyramid of what is in view. Objects within the frustum appear on the screen. The eye, or camera, is at the tip of the pyramid. The pyramid extends out along the direction the eye is looking.

FIG. 1 is a simplified functional block diagram illustrating a display system 110 for displaying images to a pilot of an aircraft landing environment. While the invention described herein may be applied to aircraft systems, the exemplary embodiments refer to a helicopter. System 110 includes multiple components each of which may be configured for mounting to a helicopter. In some embodiments, system 110 may be a self-contained system such that each of the components described below are contained in a single housing and are dedicated exclusively to serving the functions of system 110, while in other embodiments, the various components described below may be standalone components or they may be components that are used as part of other systems and which are configured to be used as a shared resource between such other systems and system 110.

In the embodiment illustrated in FIG. 1, system 110 includes Global Navigation Satellite System (GNSS) and avionics sensors 114, databases 116, a display unit 120, a display screen 122, and a processor 124 including memory 118. The databases 116 include a synthetic vision system (SVS) and a terrain and runway database. In equivalent embodiments, system 110 may include either additional or fewer components.

In some embodiments, the system 110 may operate fully or partially integrated into an enhanced vision system (not shown), or a combined vision system (not shown) when the enhanced vision system is used together with the SVS, terrain database, and the runway database.

When used, the databases 116 include a symbol database, where synthetic symbols assigned to various airport features, for example, terrain, are stored. In some embodiments this can be stored just in the memory 118 of the processor 124. In other embodiments, an external database might be used. Typically, the databases 116 would include, for example, a navigation database where runway locations would be stored, and a runway database which may include, for example, information about runway heading and width. In accordance with the exemplary embodiments described herein, symbology is stored providing an intercept point of the helicopter's flight path with the terrain.

The memory 118 may be realized as RAM memory, flash memory, EPROM memory, EEPROM memory, registers, a hard disk, a removable disk, a CD-ROM, or any other form of storage medium known in the art. In this regard, the memory 118 can be coupled to the processor 124 such that the processor 124 can be read information from, and write information to, the memory 118. In the alternative, the memory 118 may be integral to the processor 124. As an example, the processor 124 and the memory 118 may reside in an ASIC. In practice, a functional or logical module/component of the display system 110 might be realized using program code that is maintained in the memory 118. Moreover, the memory 118 can be used to store data utilized to support the operation of the display system 110, as will become apparent from the following description.

The display system 110 of the exemplary embodiment includes a position determining unit 114 that is configured to determine the position of the helicopter with respect to the surface of the earth. Such a position determining unit may include, for example but not limited to, a GNSS system or an inertial navigation system. The position determining unit 114 further includes avionics configured to receive course, speed, rate of descent, and other inputs relating to the helicopter's heading, altitude and attitude and is provided to the processor 124 as a first signal 128. Geographic position data (high integrity) may be determined by a combination of a GPS (with or without wide area augmentation system) and an inertial reference system (not shown).

The display system 110 uses the databases 116 to generate a three-dimensional image of the topographical environment of the approach to an airport (referred to hereinafter as "synthetic image") and generate a second signal 130 carrying the image and to provide the second signal 130 to processor 124. The databases 116 may include data relating to the topography environment, which may represent either or both landscape and/or man-made structures located along the helicopter's flight path. In some embodiments, the databases 116 may contain such data for an entire geographical region such as a state, a country or continent. The databases may also contain airport specific data such as position, orientation of taxiways, buildings and obstructions with an airport environment, normal or often used air-taxi route, control towers, etc.

In some embodiments, the databases 116 may include a dedicated processor, microprocessor, or other circuitry that is configured to take the information pertaining to the position, attitude, altitude and heading of the helicopter and to utilize the information available in the database to generate the second signal 130 that may be utilized by processor 124 to render a three-dimensional image of the topographical environment for a runway as well as its surrounding environment to which the helicopter is approaching. In other embodiments, the databases 116 may not include a dedicated processor, microprocessor or other circuitry. In such embodiments, the second signal 130 would include the unprocessed sensor information and location data which could then be utilized by processor 124 to render a three dimensional image. In either event, the databases 116 is configured to provide second signal 130 to processor 124.

In accordance with the exemplary embodiments, the databases 116 stores approach objects for the desired runway for the approach, as well as a plurality of other approach objects for each of a plurality of runways for which the helicopter may perform an approach for landing. Approach objects are symbology added to the display. For example, the approach objects may be two or three dimensional objects that provide a graphic image.

The display 120 is configured to provide the enhanced images to the operator. In accordance with an exemplary embodiment, the display 120 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 120 additionally may be implemented as a panel mounted display, a HUD (head-up display) projection, or any one of numerous known technologies. It is additionally noted that the display 120 may be configured as any one of numerous types of helicopter flight deck displays. For example, it may be configured as a multi-function display, a horizontal situation indicator, or a vertical situation indicator. In the depicted embodiment, however, the display 120 is configured as a primary flight display (PFD).

Additionally, display unit 120 includes a display screen 122 that is operatively connected to display unit 120. Display screen 122 is configured to be controlled by display unit 120 and may be used to display any type of image including, but not limited to, graphics and text. In some embodiments, display unit 120 may include multiple display screens 122 and/or system 110 may include multiple display units 120.

Processor 124 may be any type of computer, computer system, microprocessor, collection of logic devices, or any other analog or digital circuitry that is configured to calculate, and/or to perform algorithms, and/or to execute software applications, and/or to execute sub-routines, and/or to be loaded with and to execute any type of computer program. Processor 124 may comprise a single processor or a plurality of processors acting in concert. In some embodiments, processor 124 may be dedicated for use exclusively with system 110 while in other embodiments processor 124 may be shared with other systems on board the helicopter. In still other embodiments, processor 124 may be integrated into any of the other components of system 110.

Processor 124 is communicatively coupled to the GNSS/avionics sensors 114 and databases 116, and is operatively coupled to display unit 120. Such communicative and operative connections may be effected through the use of any suitable means of transmission, including both wired and wireless connections. For example, each component may be physically connected to processor 124 via a coaxial cable or via any other type of wired connection effective to convey electronic signals. In other embodiments, each component may be communicatively connected to processor 124 across a bus or other similar communication corridor. Examples of suitable wireless connections include, but are not limited to, a Bluetooth connection, a Wi-Fi connection, an infrared connection, OneWireless™ connection, or the like. The OneWireless™ connection has been developed by Honeywell International, Inc., the Assignee of this document.

Being communicatively and/or operatively coupled with the GNSS/avionics sensors 114, databases 116, and display unit 120 provide processor 124 with a pathway for the receipt and transmission of signals, commands, instructions, and interrogations to and from each of the other components. Processor 124 is configured (i.e., loaded with and being capable of executing suitable computer code, software and/or applications) to interact with and to coordinate with each of the other components of system 110 for the purpose of overlaying images corresponding to the second signal 130. For example, in the illustrated embodiment, the processor 124 is configured to receive a second signal 130 from the databases 116 and to send a command to the display unit 120 instructing the display unit 120 to display portions of a corresponding image generated from database or symbols, on a display screen 122. The processor 124 may also be configured to receive a first signal 128 from the helicopter's GNSS/Avionics system 114 to aid displaying data in an iconic format.

In operation, the processor 120 is configured to process data obtained from the GNSS and avionics 114 of flight status data for the host helicopter. In this regard, the sources of flight status data generate, measure, and/or provide different types of data related to the operational status of the host helicopter, the environment in which the host helicopter is operating, flight parameters, and the like. In practice, the sources of flight status data may be realized using line replaceable units (LRUs), transducers, accelerometers, instruments, sensors, and other well known devices. The data provided by the sources of flight status data may include, for example and without limitation: airspeed data; groundspeed data; altitude data; attitude data, including pitch data and roll data; yaw data; geographic position data (high integrity), such as a combination of GPS (wide area augmentation system) and inertial reference system data; time/date information; heading information; weather information; flight path data; track data; radar altitude data; geometric altitude data; wind speed data; and wind direction data.

Figure 2:
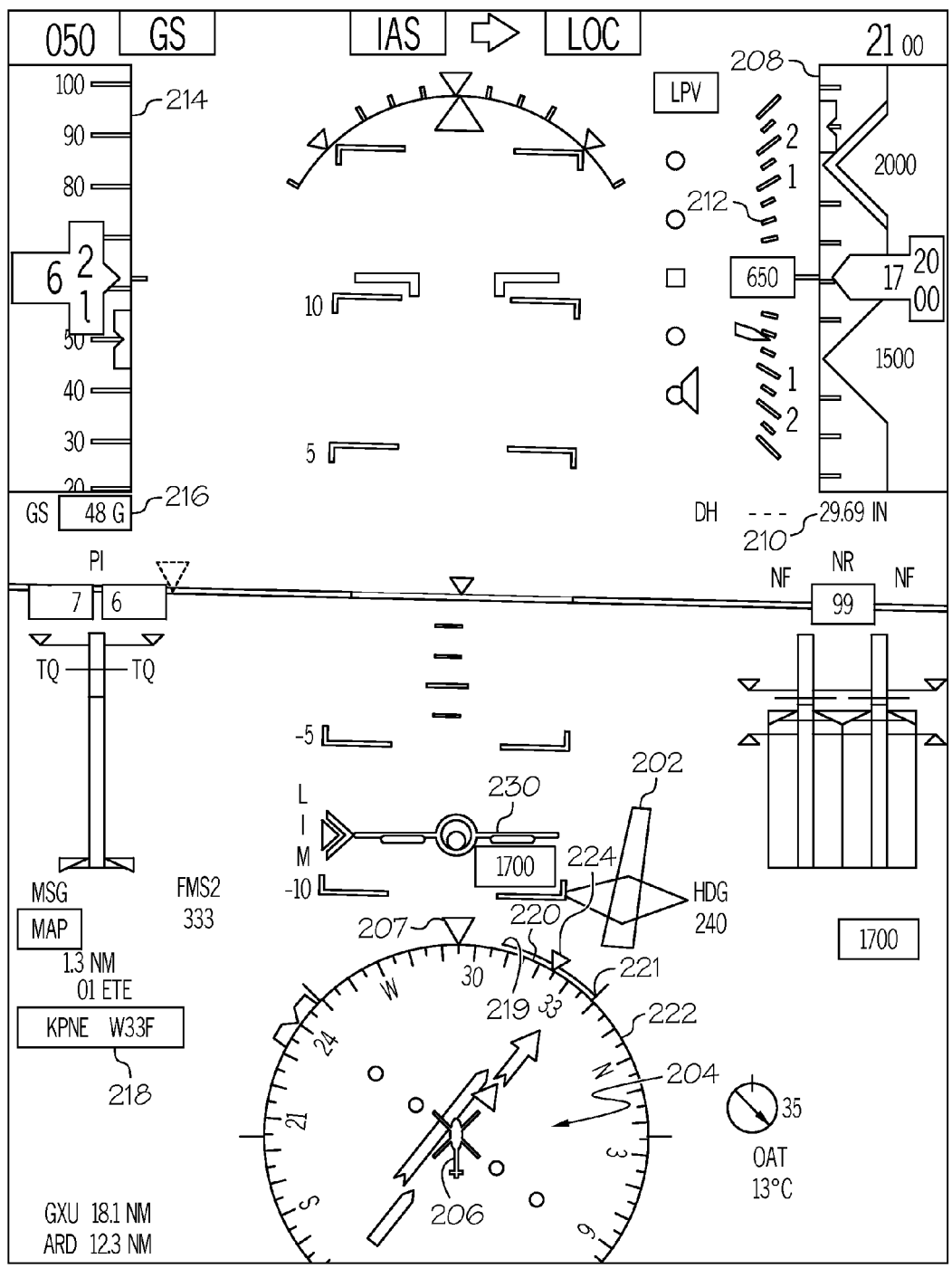
FIG. 2 is a simulated image of a landing environment generated in accordance with an exemplary embodiment.

Referring to FIG. 2, textual, graphical, and/or iconic information rendered by the display unit 120, in response to appropriate display commands from the processor 124 is depicted ahead of the aircraft, preferably as a three-dimensional perspective view. It is seen that the display unit 120 renders a view including the runway 202, the compass 204, the helicopter icon 206 representing the base helicopter, and various other data including the altimeter 208, the barometric pressure indicator 210, the vertical feet per minute indicator 212, the airspeed indicator 214, the ground speed indicator 216, and various communication channel identifiers 218. Additional data (not shown) could also be displayed, and some of those indicators, for example, 208, 210, 212, 214, 216, and 218, shown could be omitted.

The helicopter icon 206 and the index 207 are representative of the current heading relative to the specific flight path. The helicopter heading is determined, for example, by the processor 124 using data from the navigation database 116 and the avionics 114. It will be appreciated, however, that the helicopter heading may be determined by one or more other systems or subsystems, and from data or signals supplied from any one of numerous other systems or subsystems within, or external to, the helicopter. Regardless of the particular manner in which the helicopter heading is determined, the processor 124 supplies appropriate display commands to cause the display unit 120 to render the helicopter icon 206.

The flight path marker 230 is typically a circle with horizontal lines (representing wings) extending on both sides therefrom, and indicates where the plane is "aimed" during normal flight.

As the helicopter is maneuvering, for example on approach for a landing, the nose of the helicopter may not be aimed in the direction of travel (flight path), resulting in the displayed SVS view (direction of travel) not coinciding with the heading. This may be confusing during normal flight and especially during complex maneuvers or situations.

Figure 3:
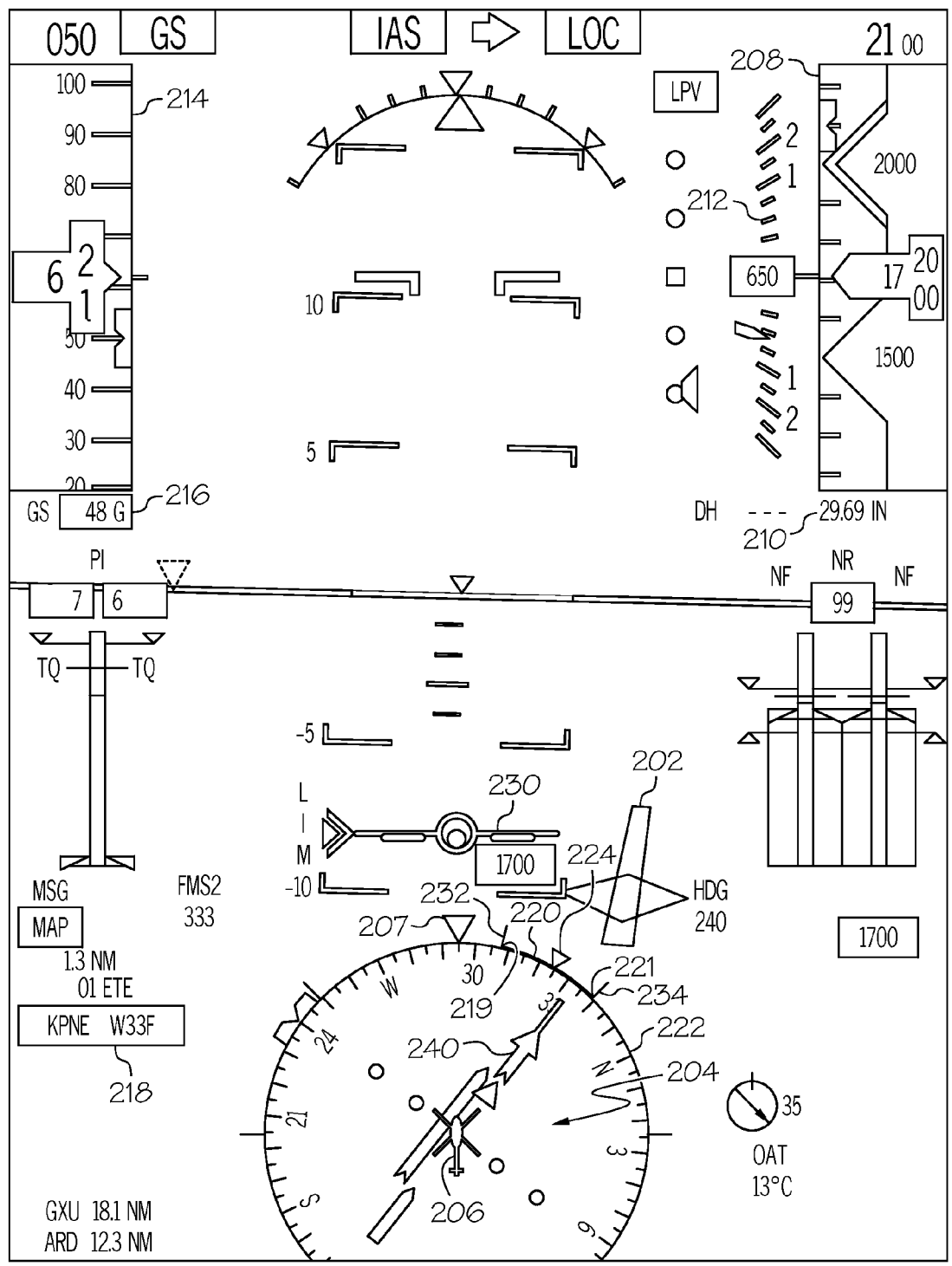
FIG. 3 is a simulated image generated in accordance with another exemplary embodiment.

In accordance with the exemplary embodiments, in order to assist the pilot maintain understanding of the current flight operation, an arc 220 representing the view frustrum is displayed contiguous (touching or near) an outer ring 222 of the compass 204 (FIG. 2 shows the arc 220 to be near, but not touching, while FIG. 3 shows the arc 220 touching the outer ring 222). While a ring is depicted in this embodiment for the outer ring 222, it could comprise any shape or form, and includes a heading scale in which the index 207 indicates numerically the current heading. While the arc 220 may be any shape or format, it preferably comprises a line, a curved line, or a narrow polygon. The arc's length is equal to the displayed SVS view. Stated otherwise, the span of the arc 220 from the end 219 to the end 221 represents in degrees the displayed horizontal SVS view.

An index 224 may be placed in the middle of the arc 220 indicating the center of the SVS view, or the direction in which the nose of the aircraft is pointing. The arc 220 may comprise a format different from the format of the compass 204, and may include markers 232, 234 (FIG. 3) at the ends 219, 221 of the arc 220 to improve clarity when obscured by other symbols (not shown). Additionally, the format, for example intensity, may change or increase the greater the difference between the heading and the view frustum direction. A course pointer 240 may be displayed to indicate the desired course.

Figure 4:
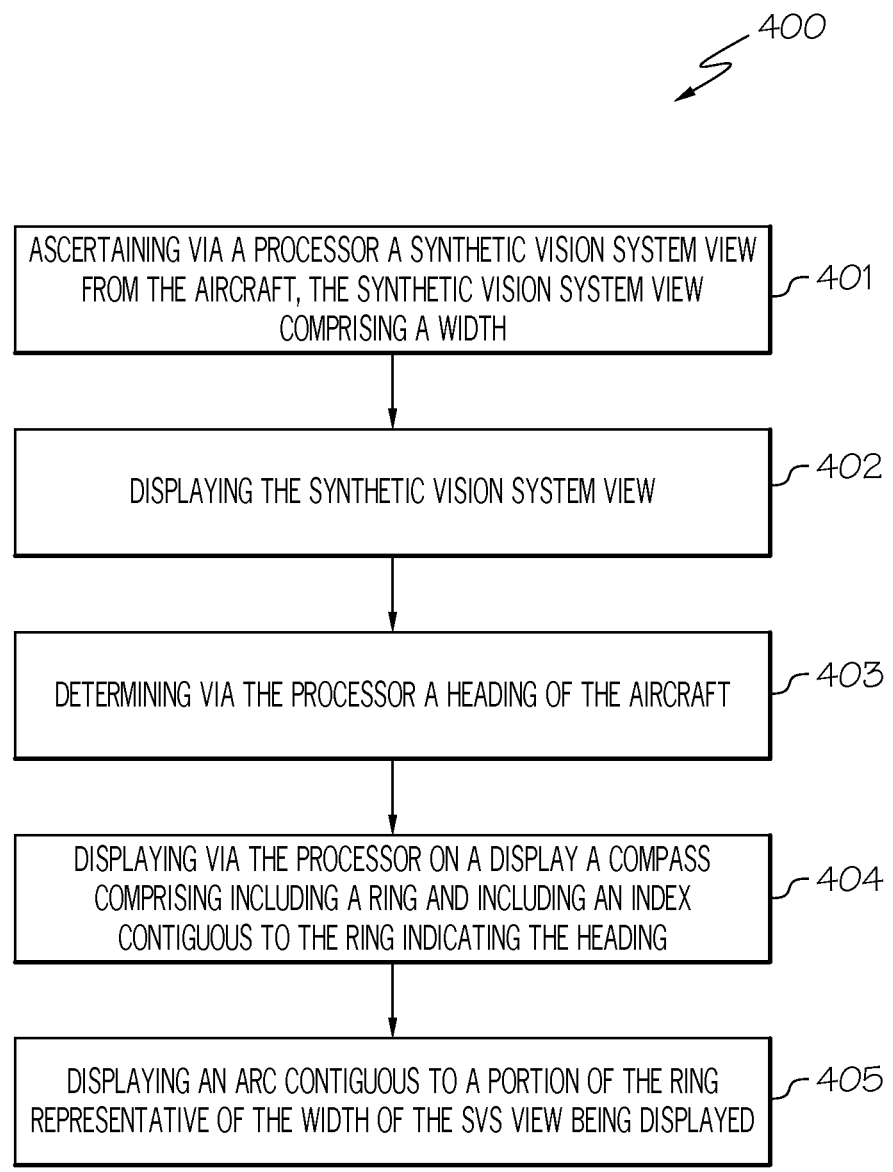
FIG. 4 is a flow chart of a method in accordance with the exemplary embodiment.

FIG. 4 is a flow chart that illustrates an exemplary embodiment of a display process 400 suitable for use with a flight deck display system such as the display system 110. Process 400 represents one implementation of a method for displaying helicopter traffic information on an onboard display element of a host helicopter. The various tasks performed in connection with process 400 may be performed by software, hardware, firmware, or any combination thereof. For illustrative purposes, the following description of process 400 may refer to elements mentioned above in connection with FIG. 4. In practice, portions of process 400 may be performed by different elements of the described system, e.g., a processor, a display element, or a data communication component. It should be appreciated that process 400 may include any number of additional or alternative tasks, the tasks shown in FIG. 4 need not be performed in the illustrated order, and process 400 may be incorporated into a more comprehensive procedure or process having additional functionality not described in detail herein. Moreover, one or more of the tasks shown in FIG. 4 could be omitted from an embodiment of the process 400 as long as the intended overall functionality remains intact.

In accordance with an exemplary embodiment, and referring to FIG. 4, method of providing visual guidance for maneuvering an aircraft, comprising ascertaining 401 via a processor a synthetic vision system view from the aircraft, the synthetic vision system view comprising a horizontal span; determining 402 via the processor a heading of the aircraft; displaying 403 via the processor on a display a compass including an index indicating the heading, the compass including a ring; displaying 404 the synthetic vision system view; and displaying 405 an arc contiguous to a portion of the circumscribed ring representative of the horizontal span of the synthetic vision system view being displayed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims.

What is claimed is:

1. A display system for an aircraft comprising:
   a display;
   an avionics system;
   a synthetic vision system; and
   a processor coupled to the display, avionics system, and synthetic vision system, the processor configured to:
   ascertain flight parameters of the aircraft from the avionics system, the flight parameters including a heading;
   ascertain a view from the aircraft from the synthetic vision system, the view comprising a horizontal span;
   provide commands to the display to display the view;
   provide commands to the display to display a compass including a first index indicating the heading, the compass including a heading scale; and
   provide commands to the display to display an arc contiguous or adjacent to a portion of the heading scale, the arc having a span that represents the horizontal span of the synthetic vision system view being displayed.

2. The display system of claim 1 wherein the processor is further configured to:
   provide commands to the display to display a second index located at a center of the arc indicating a center point of the synthetic vision system view.

3. The display system of claim 1 wherein the processor is further configured to:
   provide commands to the display to display the arc in a first format and the circumscribed ring in a second format.

4. The display system of claim 1 wherein the processor is further configured to:
   provide commands to the display wherein the arc is moved in relation to the heading scale as a flying condition of the aircraft changes.

5. The display system of claim 1 wherein the processor is further configured to:
   provide commands to the display to display changing a format of the arc as the difference between the heading and the view changes.

6. The display system of claim 1 wherein the processor is further configured to:
   provide commands to the display to display a first line from a center of the compass to a first end of the arc, and a second line from the center to a second end of the arc.

7. The display system of claim 1 wherein the processor is further configured to:
   provide commands to the display to display a course pointer within the compass indicating the desired ground track.

8. A display system for an aircraft, the display system comprising:
   a display;
   an avionics system;
   a synthetic vision system; and
   a processor coupled to the display, the avionics system, and the synthetic vision system, the processor configured to:
   determine a heading of the aircraft from the avionics system;

ascertain a view from the aircraft from the synthetic vision system;

provide commands to the display to display the view;

provide commands to the display to display a compass including an index indicating the heading, the compass including a ring; and provide commands to the display to display an arc associated with a portion of the ring, the arc having a span that represents the horizontal span of the view being displayed.

9. The display system of claim 8 wherein the processor is further configured to:

provide commands to the display wherein the arc is moved in relation to the ring as a heading of the aircraft changes.

10. The display system of claim 8 wherein the processor is further configured to:

provide commands to the display to display changing a format of the arc as the difference between the heading and the view changes.

11. The display system of claim 8 wherein the processor is further configured to:

provide commands to the display to display a course pointer within the compass indicating the desired ground track.

12. A method of providing visual guidance for maneuvering an aircraft, comprising:

ascertaining via a processor a synthetic vision system view from the aircraft, the synthetic vision system view comprising a horizontal span;

determining via the processor a heading of the aircraft;

displaying via the processor on a display a compass including an index indicating the heading, the compass including a ring;

displaying the synthetic vision system view; and displaying an arc contiguous to a portion of the circumscribed ring, the arc having a span that represents the horizontal span of the synthetic vision system view being displayed.

13. The method of claim 12 wherein the arc is touching the ring of the compass.

14. The method of claim 12 wherein the arc is spaced from the circumscribed ring of the compass.

15. The method of claim 12 further comprising an index located at a center of the arc indicating a center point of the synthetic vision system view.

16. The method of claim 12 wherein the arc comprises a first format and the circumscribed ring comprises a second format.

17. The method of claim 12 wherein the arc is moved in relation to the circumscribed ring as a heading of the aircraft changes.

18. The method of claim 12 further comprising changing a format of the arc as the difference between the heading and the synthetic vision system view changes.

19. The method of claim 12 further comprising displaying a first line from a center of the compass to a first end of the arc, and a second line from the center to a second end of the arc.

20. The method of claim 12 further comprising a course pointer within the compass indicating a desired ground track.

* * * * *